United States Patent [19]
Sakasegawa et al.

[11] 3,805,230
[45] Apr. 16, 1974

[54] LIQUID COOLANT LEVEL DROP ALARMING SYSTEM

[75] Inventors: Hiroshi Sakasegawa; Mitsuru Iizuka, both of Yokohama; Takenori Senju, Fujisawa, all of Japan

[73] Assignee: Nissan Motor Company, Limited, Yokohama, Japan

[22] Filed: May 23, 1972

[21] Appl. No.: 256,098

[30] Foreign Application Priority Data
Nov. 2, 1971   Japan............................ 46-101549
Dec. 17, 1971  Japan............................ 46-119134

[52] U.S. Cl............................. 340/59, 340/244 A
[51] Int. Cl............................................ G08b 21/00
[58] Field of Search ...... 340/52 R, 52 F, 59, 244 R, 340/244 A, 244 D

[56] References Cited
UNITED STATES PATENTS
3,204,230   8/1965   Hoseford, Jr. ................. 340/59 X
3,646,541   2/1972   Rathburn ...................... 340/244 C
3,593,270   7/1971   Walker ............................ 340/59
3,631,440  12/1971   Cliffgard ......................... 340/59
2,877,318   3/1959   Culley ........................... 340/59 X Primary Examiner—Alvin H. Waring

[57] ABSTRACT

A liquid coolant level drop alarming system which comprises a level drop detector mounted on the upper tank of the radiator of a motor vehicle and having a conductivity varied upon a level drop of the liquid coolant till a preselected level, and indicating means for indicating the variation of the conductivity of the level drop detector. Either a thermistor or switch means including a magnetic reed switch and a magnetic float means surrounding the magnetic reed switch can be utilized for the system.

10 Claims, 6 Drawing Figures

PATENTED APR 16 1974 3,805,230

LIQUID COOLANT LEVEL DROP ALARMING SYSTEM

The present invention relates to a liquid coolant level drop alarming system and more particularly to a liquid coolant level drop alarming system which is reliable in detecting a level of the liquid coolant contained in the radiator of a motor vehicle. The specific purpose of the present invention is to provide a simple, compact, safe and reliable liquid coolant level drop alarming system.

Generally the system of the invention comprises a level drop detector mounted on the upper tank of the radiator of a motor vehicle having a conductivity varied upon a level drop of the liquid coolant till a preselected level, and indicating means for indicating the variation of conductivity of the level drop detector. The level drop detector is either a thermistor or switch means including a magnetic reed switch and a magnetic float means surrounding the magnetic reed switch.

The specific structure of the invention will be understood when the detailed description is read in conjunction with the drawings in which.

Figure 5:
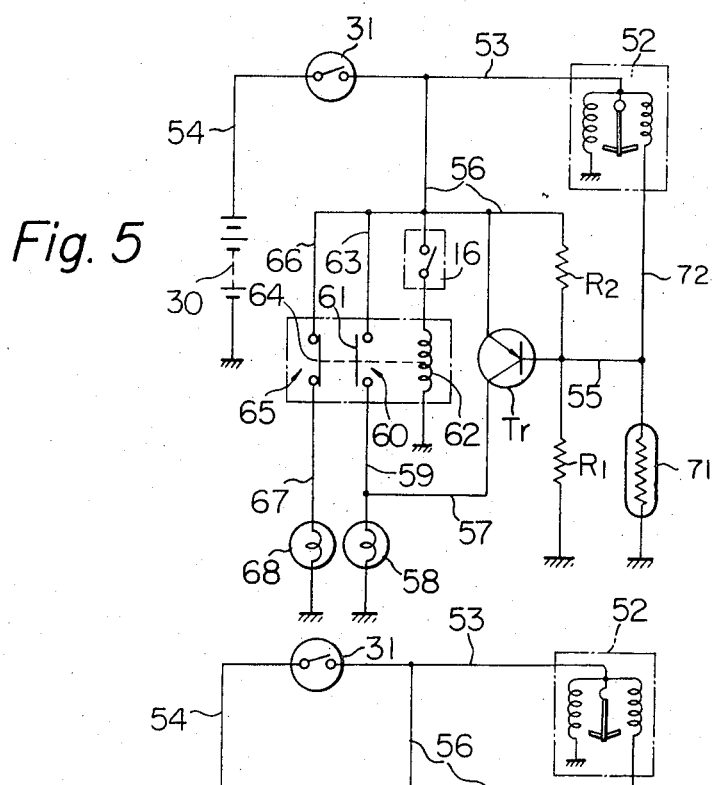
Figure 6:
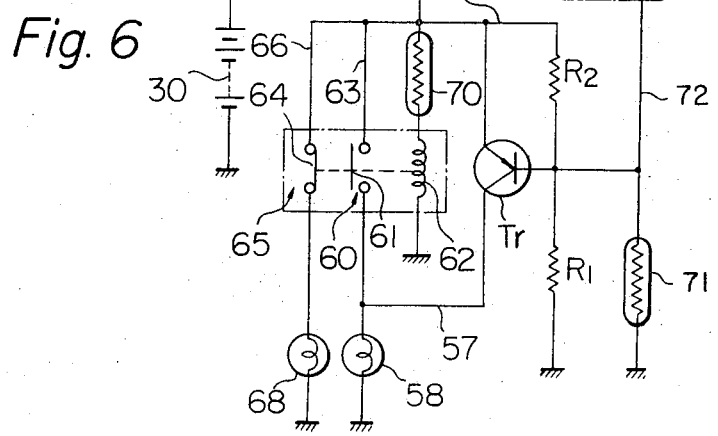

FIG. 5 is a diagram illustrating a further circuit arrangement incorporated with the level detector and a thermistor sensing the temperature of the liquid coolant; and FIG. 6 is a diagram illustrating a still further circuit arrangement incorporated with two thermistor for detecting the level and temperature of the liquid coolant. Corresponding numerals of reference designate the like parts in the views.

Figure 1:
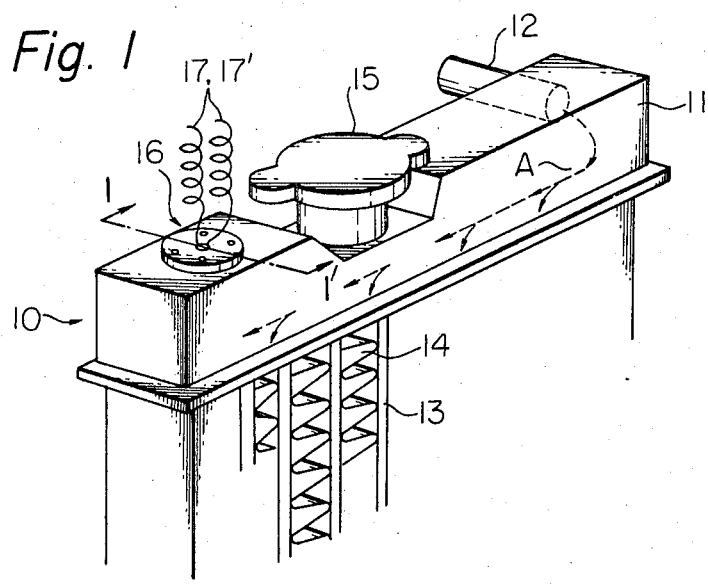
FIG. 1 is a schematic view showing an upper portion of a radiator of a motor vehicle.

Referring now to the drawings and more specifically to FIG. 1 thereof, there is shown an upper portion of a radiator 10 which includes an upper tank 11 communicating with coolant receiving chambers (not shown) of an internal combustion engine of the motor so as to receive the liquid coolant through an inlet pipe 12. The liquid coolant in the upper tank 11 flows as indicated by arrows A and passes through a series of pipes or tubes 13 surrounded by fins 14. A cap 15 caps a coolant supply inlet at a central recess portion of the upper tank 11. At a most remote portion of an upper wall of the upper tank 11 from the inlet pipe 12 is positioned a level drop detector 16 for detecting the level drop of the liquid coolant in the upper tank 11. The level drop detector 16 is arranged to change its conductivity when the level of the liquid coolant drops below a preselected level. The change of the conductivity of the level drop detector 16 is picked-up through a pair of lead wires 17 and 17'.

Figure 2:
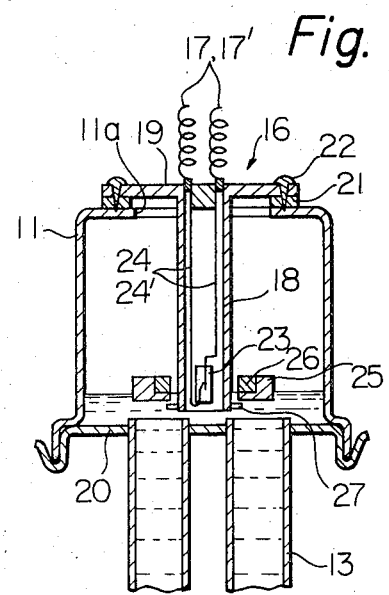
FIG. 2 is a sectional view taken along a line 1–1' shown in FIG. 1.

In FIG. 2, the upper tank 11 is provided at its upper wall with an aperture 11a into which an elongated tubular portion 18 of a housing 19 of the level drop detector 16 is inserted, the tubular portion 18 having a length generally equal to the height of the upper wall from a bottom 20 of the tank 11. An enlarged portion of the housing 19 of the level drop detector 16 removably secured through a sealing ring member 21 to the upper wall of the upper tank 11 by means of screws 22 so as to hermetically seal the aperture 11a. A magnetic reed switch 23 having two terminals respectively connected a pair of lead 24 and 24' to the lead wires 17 and 17' is placed in an end portion of the elongated tubular portion 18. A ring float 25 which is to float on the liquid coolant in the tank 11 is coupled through its central bore to the elongated tubular portion 18. A ring permanent magnet 26 is mounted on the ring float 25. The ring permanent magnet may replaced by one or more permanent magnet having other shape, if desired. A clamp member 27 is fastened on the end portion of the tubular portion 18 so as to prevent the float 25 from decoupling from the tubular portion 18.

When the level of the liquid coolant in the tank 11 reaches such a level as shown in FIG. 2, the magnet 26 overlies the magnetic reed switch 23, which is then actuated to close. Such closure state of the reed switch 23 is indicated by a suitable indicating means such as an electric circuit connected to the lead wires 17 and 17'. In this instance, it should be noted that since turbulences on the coolant surface in the tank 11 generated in an inlet portion adjacent to the inlet pipe 12 is gradually dampened in a direction toward the level drop detector 16, the level drop detector 16 is not adversely affected by the turbulence. The level drop detector 16 is therefore extremely reliable in detecting the level drop of the liquid coolant. Furthermore, since the level detector 16 is removable mounted on the upper wall of the upper tank 11, the detector 16 is readily replaced by a new one when the detector 16 is broken.

Figure 3:
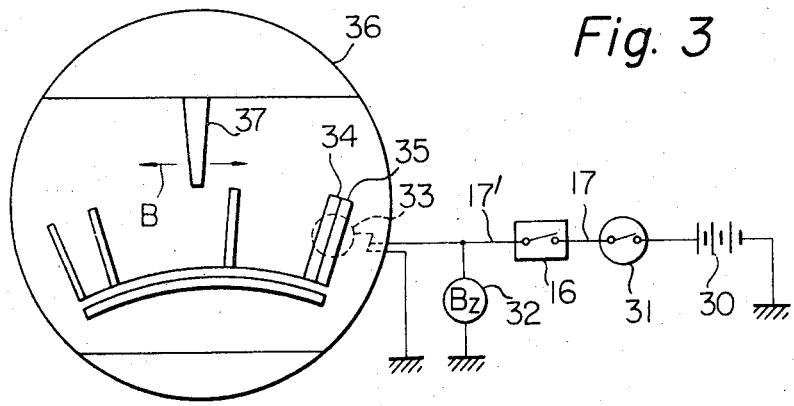
FIG. 3 is a diagram illustrating a circuit arrangement incorporated with a level detector in FIG. 2.

In FIG. 3, a preferred embodiment of the indicating means according to the invention, in which a d-c electric power source 30 has a negative terminal grounded and a positive terminal connected to one contact of the ignition switch 31. The other terminal of the ignition switch 31 is connected through the lead 17 to one contact of the magnetic reed switch 16. The other terminal of the reed switch 16 is connected through the lead 17' to one terminal of a buzzer 32 the other terminal of which is grounded. The other terminal of the reed switch 16 is further connected through the lead 17' to one terminal of a red-colored lamp 33 which is positioned behind white and red graduations 34 and 35 on a scale plate 36 of a temperature indicator having a pointer 37 movable either rightwardly or leftwardly as indicated by arrows B. The other terminal of the lamp 33 is grounded.

When, in operation, the liquid coolant in the tank 11 reaches to a preselected level and the reed switch is actuated to close while, of course, the ignition switch 31 is closed, and electric power from the power source 30 is delivered through the ignition switch 31 and the reed switch 16 to the buzzer 32 and the red lamp 33, whereby the buzzer rings to inform the operator of the level drop of the liquid coolant and, on the other hand, the lamp 33 irradiates the white graduation 34 to light red and the red graduation 35 more red.

Figure 4:
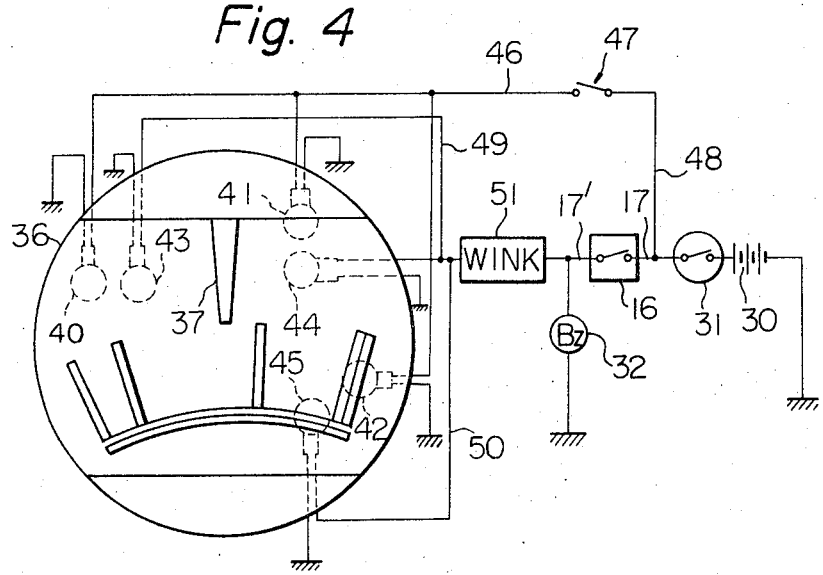
FIG. 4 is a diagram illustrating another circuit arrangement incorporated with the level detector in FIG. 2.

In FIG. 4, there is shown another embodiment of the indicating means, which has a similar construction as that of FIG. 3, except that the scale plate 36 is provided behind it with green lamps 40, 41 and 42, and red lamps 43, 44 and 45. Each of the green lamps 40, 41 and 42 has one terminal grounded and the other terminal connected through a line 46 to one contact of a main switch 47 which is actuated during the nighttime. The other contact of the main switch 47 is connected through a line 48 to the lead wire 17. Each of the red lamps has one terminal grounded and the other terminal connected through lines 49 and 50 to an output terminal of a wink circuit 51 which may be an astable multivibrator. An input terminal of the wink circuit is connected to the lead wire 17'. The wink circuit 51 is arranged to produce on the output terminal a pulse signal as long as the wink circuit 51 is energized by an electric energy applied to the input terminal thereof. The wink circuit 51 may, of course, be omitted, if preferred.

When, in operation, the ignition switch 31 and the main switch 47 are closed, the green lamps 40, 41 and 42 glow green so as to make the scale plate 36 light green. When, in this instance, the level of liquid coolant in the tank 11 reaches the preselected level, the level detector 16 close its circuit so that an electric energy from the power source 30 is supplied to the red lamps 43, 44 and 45 to glow red whereby the scale plate 36 lights red on the whole. At the same time, the buzzer 32 is energized by the electric power.

In FIG. 5, a further embodiment of the indicating means of the invention which is incorporated with a temperature detecting thermistor 71 submerged into the liquid coolant. The thermistor 71 has a resistance varied in dependence on the ambient temperature, in this case, the temperature of the liquid coolant. One terminal of the thermistor 71 is grounded and the other terminal of the thermistor 71 is connected through a line 72 to one terminal of a temperature indicator 52. The other terminal of the temperature indicator 52 is connected through a line 53 to one contact of the ignition switch 31. The other terminal of the ignition switch 31 is connected through a line 54 to one terminal of a d-c electric power source 30 having the other terminal grounded. The other terminal of the thermistor 71 is further connected through a line 55 to a base of a transistor Tr. The base of the transistor Tr is connected through a resistor $R_1$ to the ground and through a resistor $R_2$ to a line 56 which is connected to the line 53. The resistors $R_1$ and $R_2$ serves as a divider which develops a predetermined potential at the base of the transistor Tr. The transistor has an emitter connected to the line 56 and a collector connected through a line 57 to one terminal of an alarm lamp 58 the other terminal of which is grounded. The one terminal of the alarm lamp 58 is connected through a line 59 to one stationary contact of a normally open relay switch 60. The relay switch 60 has a movable contact 61 associated with a relay coil 62 and the other stationary contact connected through a line 63 to the line 56. The relay coil 62 has one terminal grounded and the other terminal connected through the reed switch of the level drop detector 16 to the line 56. The relay coil 62 associates with a movable contact 64 of a normally closed relay switch 65. The relay switch 65 has one stationary contact connected through a line 66 to the line 56 and the other stationary contact connected through a line 67 to one terminal a lamp 68 having the other terminal grounded.

When the ignition switch 31 is closed and a sufficient amount of the liquid coolant is carried by the tank 11, a current flows from the power source 30 through the ignition switch and the switch 64 to the lamp 68 which then glows to inform the operator of the presence of the sufficient amount of the liquid coolant. When, on the contrary, the level of the liquid coolant drops below a predetermined level and the level detector 16 closes its circuit, the relay coil 62 is energized with the result that the switch 65 is opened and the switch 60 is closed whereby the lamp 68 is extinguished and on the contrary the lamp 58 glows to inform the operator of the level drop of the coolant.

If, on the other hand, the engine of the motor vehicle overheats and the temperature of the coolant exceeds an allowable limit, the resistance of the thermistor 71 decreases until such a large current flows through the thermistor 71 as to make the transistor Tr conductive thereby to energize the lamp 58. It is to be understood that when the temperature increase and the level drop of the coolant take place at the same time, the lamp 58 glows at an increased luminous intensity. Of course, the temperature indicator 52 continues to indicate the temperature of the coolant under any conditions.

In FIG. 6, there is shown a still further embodiment of the alarming system of the invention which has the same construction as that of FIG. 5 except that a thermistor 70 is utilized for the level detector 16. The thermistor 70 may be so positioned in the upper tank that the thermistor 70 is exposed to the ambient air when the level of the coolant drops below the preselected level. With this arrangement, when the level of the coolant drops below the preselected level, the resistance of the thermistor 70 decreases so much as to sufficiently energize the relay coil 62 to actuate the relay switches 60 and 65.

It should be apparent from the above detailed description that an improved liquid coolant level drop alarming system has been provided. The described system is simple, compact, reliable and safe.

It will be understood that the invention is not to be limited to the exact construction shown and described and that various changes and modifications may be made without departing from the spirit and scope of the invention, as defined in the appended claims.

What is claimed is:

1. In combination with a radiator of a motor vehicle, which radiator has an upper tank with a liquid inlet, of a liquid coolant level drop alarm system, comprising:
   a. means defining an opening through an upper wall of the upper tank, said opening being located remote from the liquid inlet of the upper tank;
   b. a liquid drop detector including
      a tubular portion extending through said opening and mounted within said upper tank and
      a magnetic reed switch positioned in said tubular portion;
   c. a magnetic float means floating on the liquid coolant and surrounding said tubular portion, said float means being movable over said magnetic reed switch so that when the coolant reaches a preselected level said magnetic float means operates said magnetic reed switch; and
   d. first indicating means connected to said magnetic reed switch and indicating when said magnetic reed switch is actuated.

2. A combination as claimed in claim 1, in which said first indicating means includes a first alarm lamp, and an electric circuit connected to said magnetic reed switch and said first alarm lamp and energizing said first alarm lamp when said magnetic reed switch is actuated.

3. A combination as claimed in claim 2, further comprising a temperature indicator of the motor vehicle and said first alarm lamp is positioned within said temperature indicator.

4. A combination as claimed in claim 2, in which said electric circuit includes a relay coil connected through said magnetic reed switch to a d-c power source, and a relay switch associated with said relay coil and interconnecting said d-c power source and said first alarm lamp.

5. A combination as claimed in claim 1, which further comprises:
a thermistor submerged into the liquid coolant, and second indicating means connected to said thermistor for indicating when the temperature of the liquid coolant exceeds a predetermined level.

6. A combination as claimed in claim 5, in which said second indicating means includes a second alarm lamp, and an electric circuit connected between said thermistor and said alarm lamp and energizing said alarm lamp when the resistance of said thermistor lowers below a preselected resistance.

7. A combination as claimed in claim 6 in which said electric circuit includes a transistor interconnecting said alarm lamp and an electric power source, and said thermistor is connected to a base of said transistor forming a biasing circuit for said transistor, said transistor being made conductive when a biasing current passing through said thermistor reaches a predetermined magnitude.

8. A combination as claimed in claim 7 which further comprises a temperature indicator having a coil, one terminal of which coil is connected to said electric power source and the other terminal to said thermistor.

9. A combination with a radiator of a motor vehicle which radiator has an upper tank of a liquid coolant level drop alarm system comprising:
a. a liquid level detector positioned in said upper tank and detecting when the level of coolant reaches a predetermined level, a relay coil connected through said level drop detector to an electric power source, which relay coil is associated with a normally closed switch and a normally open switch;

b. an indicating lamp connected through said normally closed switch to said electric power source;

c. another indicating lamp connected through said normally open switch to said electric power source;

d. a transistor interconnecting said another indicating lamp and said electric power source in parallel to said normally open switch; and e. a temperature detecting thermistor submerged into the coolant, which temperature detecting thermistor is connected to a base of said transistor and forming a biasing circuit for said transistor, said biasing circuit making said transistor conductive when the resistance of said temperature detecting thermistor goes below a predetermined magnitude, whereby both said indicating lamp and said another indicating lamp are energized when the level of said coolant is over the predetermined level and the temperature of the coolant exceeds predetermined temperature, while only said another indicating lamp is energized when the level of the coolant falls below the predetermined level and regardless of the coolant temperature.

10. A combination as claimed in claim 9 in which said liquid level detector includes a thermistor, one terminal of which thermistor is connected to said relay coil and the other terminal to said electric power source.

* * * * *